(12) United States Patent
Mahabadipour et al.

(10) Patent No.: US 12,270,468 B2
(45) Date of Patent: *Apr. 8, 2025

(54) HYDRAULIC DAMPING RAIL FOR POWER SHIFT TRANSMISSION

(71) Applicant: CNH Industrial America LLC, New Holland, PA (US)

(72) Inventors: Hamidreza Mahabadipour, Chicago, IL (US); Haibo Guo, Naperville, IL (US)

(73) Assignee: CNH Industrial America LLC, Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,256

(22) Filed: Nov. 30, 2023

(65) Prior Publication Data

US 2024/0093778 A1     Mar. 21, 2024

Related U.S. Application Data

(63) Continuation of application No. 17/561,521, filed on Dec. 23, 2021, now Pat. No. 11,879,543.

(51) Int. Cl.
  *F16H 61/00*    (2006.01)
  *F16H 61/04*    (2006.01)
  *F16L 55/05*    (2006.01)

(52) U.S. Cl.
  CPC ..... *F16H 61/0009* (2013.01); *F16H 61/0025* (2013.01); *F16H 61/04* (2013.01); *F16L 55/05* (2013.01)

(58) Field of Classification Search
  CPC .. F16H 61/0009; F16H 61/0025; F16L 55/05; F16D 2048/0215; F16D 2300/22
  See application file for complete search history.

(56) References Cited

U.S. PATENT DOCUMENTS

| | | | |
|---|---|---|---|
| 4,093,051 A * | 6/1978 | Kreitzberg | F16H 61/0274 192/85.61 |
| 9,079,576 B2 * | 7/2015 | Oouchida | B60W 10/30 |
| 10,619,726 B2 | 4/2020 | Paul et al. | |
| 11,879,543 B2 * | 1/2024 | Mahabadipour | F16H 61/0025 |
| 2017/0284510 A1 | 10/2017 | Iwaki et al. | |

* cited by examiner

*Primary Examiner* — Huan Le
(74) *Attorney, Agent, or Firm* — Rickard K. DeMille; Rebecca L. Henkel; Peter K. Zacharias (57) ABSTRACT

A hydraulic damping rail includes a primary rail wall defining a primary rail volume, a rail inlet structured to provide communication of hydraulic fluid between a hydraulic pump and the primary rail volume, and a plurality of rail outlets configured to provide communication between the primary rail volume and a plurality of clutch valves. A spacing between adjacent pairs of rail outlets of the plurality of rail outlets is variable.

20 Claims, 4 Drawing Sheets

HYDRAULIC DAMPING RAIL FOR POWER SHIFT TRANSMISSION

CROSS-REFERENCE TO RELATED APPLICATIONS

This application is a continuation of U.S. patent application Ser. No. 17/561,521, filed Dec. 23, 2021, which is incorporated herein by reference in its entirety.

BACKGROUND

The present disclosure relates generally to power shift transmissions. More specifically, the present disclosure relates to hydraulic systems for operating hydraulic clutch valves of a power shift transmission.

SUMMARY

One embodiment relates to a hydraulic damping rail for a power shift transmission. The hydraulic damping rail includes a primary rail wall defining a primary rail volume, a rail inlet structured to provide communication of hydraulic fluid between a hydraulic pump and the primary rail volume, and a plurality of rail outlets configured to provide communication between the primary rail volume and a plurality of clutch valves. A spacing between adjacent pairs of rail outlets of the plurality of rail outlets is variable.

Another embodiment relates to a hydraulic damping rail for a power shift transmission. The hydraulic damping rail includes a rail wall defining a volume where a cross-sectional dimension of the volume varies along a length of the rail wall, a rail inlet configured to fluidly couple the volume to a hydraulic pump, and a plurality of rail outlets configured to fluidly couple the volume to a plurality of clutch valves.

Still another embodiment relates to a hydraulic damping rail for a power shift transmission. The hydraulic damping rail includes a rail wall defining a volume, a rail inlet configured to fluidly couple the volume to a hydraulic pump, a plurality of rail outlets, and a manifold fluidly coupled to the plurality of rail outlets. The manifold is configured to fluidly couple to a plurality of clutch valves.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a hydraulic damping rail of the present disclosure provides a damped hydraulic distribution structure that provides pressurized hydraulic fluid to clutch valves of a power shift transmission for a vehicle. The power shift transmission includes shafts, gears, and clutches and transfers power from the source of energy (e.g., an internal combustion engine) to a downstream tractive element (e.g., axles and wheels). If the load varies downstream, it may be advantageous to shift the gear up or down to keep the engine at its optimal operating conditions. Also, gear shifting is important for maximizing the performance of the vehicle (e.g., reducing fuel consumption). For example, while the vehicle (e.g., a tractor) is ploughing in a field and moving at eight kilometers per hour (8 kph) with the transmission in seventh gear (i.e., gear 7), if a hard section of soil is encountered and results in an increased load, the driver or the control system may downshift to sixth gear (i.e., gear 6) and increase engine speed to keep the vehicle moving at eight kilometers per hour (8 kph). If the load decreases in the field, the driver or the control system may upshift to eight gear (i.e., gear 8) to maintain a desired vehicle speed. Gear shifting happens frequently during any vehicle operation and fast and smooth gear shifting is always desirable. The hydraulic damping rail discussed herein provides an improved gear shift speed and smoothness.

Overall Vehicle

Figure 1:
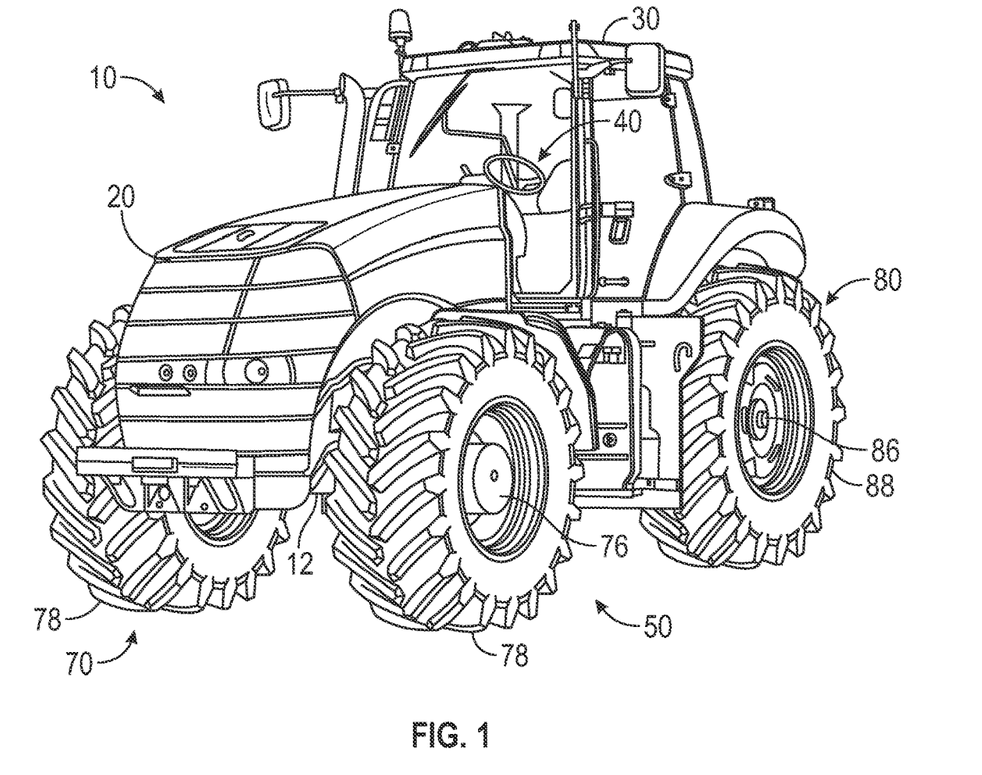
FIG. 1 is a perspective view of a vehicle, according to an exemplary embodiment.
Figure 2:
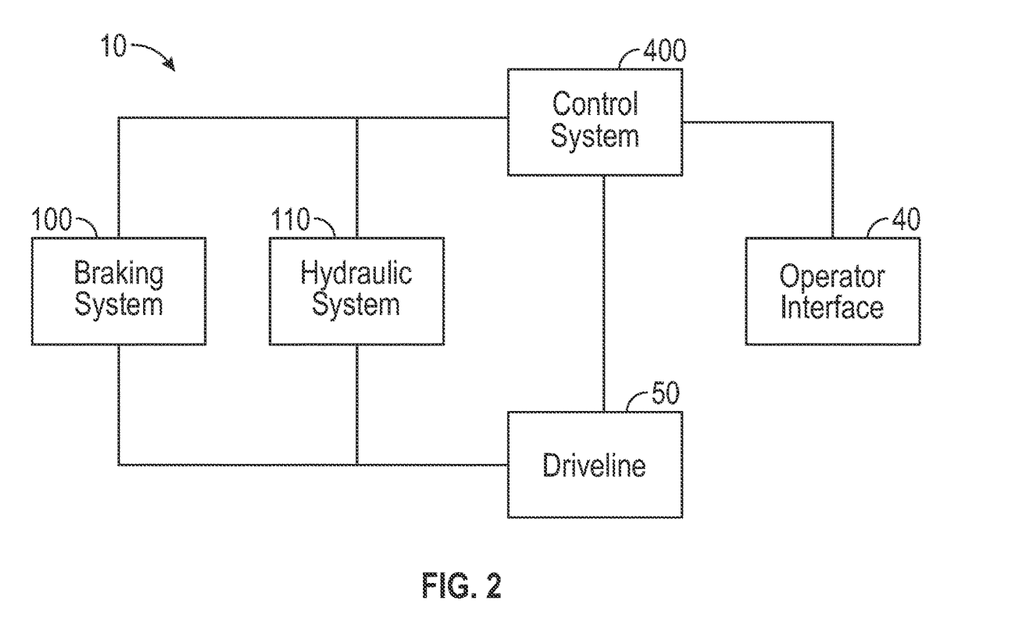
FIG. 2 is a schematic block diagram of the vehicle of FIG. 1, according to an exemplary embodiment.
Figure 3:
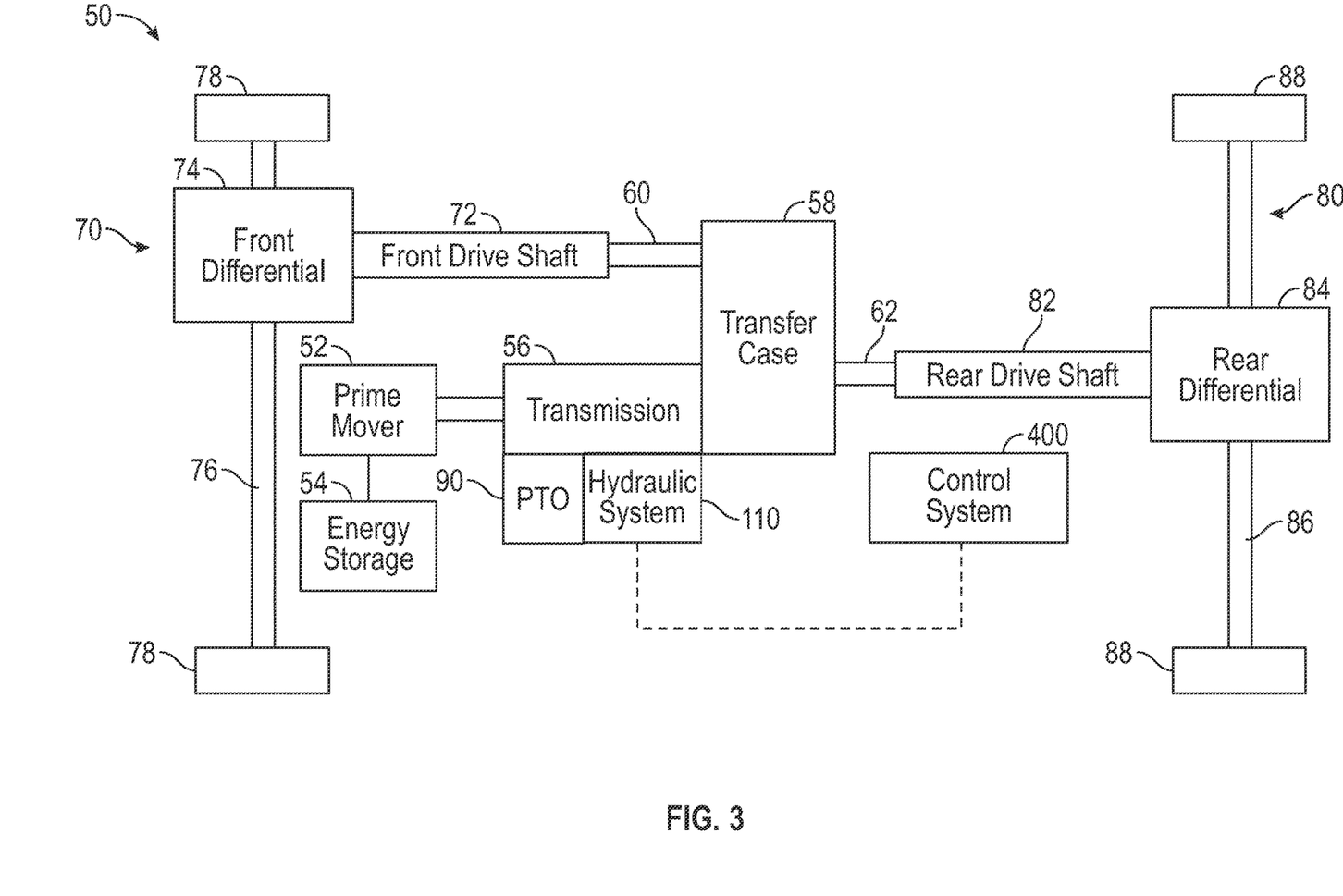
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; a hydraulic system 110 for providing hydraulic power to vehicle systems or coupled implements; and a vehicle control system, shown as control system 400, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a windrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more coupled implements (e.g., hitched and/or trailed implements) such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., storing hydrogen, producing electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drives (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to provide rotary power for driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

With continued reference to FIG. 3, the hydraulic system 110 may be directly driven by the prime mover 52, by a secondary prime mover (e.g., an electric machine, an onboard generator set, etc.) or by another portion of the driveline 50.

The hydraulic system 110 provides hydraulic power to the transmission 56. In some embodiments, the transmission 56 includes a hydraulic power shift transmission including clutch packs that are selectively engaged and disengaged to adjust a gear ratio of the transmission 56. Each clutch pack may be controlled by a hydraulic valve (e.g., an electrically actuated solenoid valve) that selectively provides hydraulic flow or inhibits hydraulic flow to engage or disengage the clutch pack. In some examples, each clutch pack is arranged as a normally disengaged clutch pack and includes a spring or other biasing element that provides a bias toward a disengaged arrangement of the clutch pack, and hydraulic fluid pressure provided by the hydraulic valve can overcome the bias to move the clutch pack into an engaged arrangement. In some embodiments, each clutch pack can be arranged as a normally engaged clutch pack and the application of hydraulic fluid pressure via the hydraulic valve can move the clutch pack toward the disengaged arrangement.

In some embodiments, the transmission 56 includes a plurality of clutch packs. Each clutch pack is arranged in communication with the control system 400 to selectively engage and disengage the clutch packs of the transmission 56 to provide a desired gear ratio. In some embodiments, the control system 400 receives inputs from the operator interface 40 and implements a gear ratio selected by an operator via the operator interface 40. For example, the operator interface may include a paddle shift interface that is engagable by the operator to select the desired gear ratio. The control system 400 can include an engine control unit (ECU), a transmission control unit (TCU), a brake controller, an after treatment system control unit, a PTO control unit, a hydraulic system control unit, or any other controller, control system, or processor of the vehicle 10. The control system 400 described herein includes processing circuits and memory that is capable of providing the functionality of systems, apparatuses, and methods described herein. In some embodiments, the functions of the control system 400 described herein may be spread between multiple physical controllers distributed through the vehicle 10 or may include cloud computing functions residing in a cloud or server remote from the vehicle 10. In some embodiments, the control system 400 described herein may be provided on a single control unit including processing circuits and memory.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

Hydraulic Control System for Hydraulic Power Shift Transmission

Figure 4:
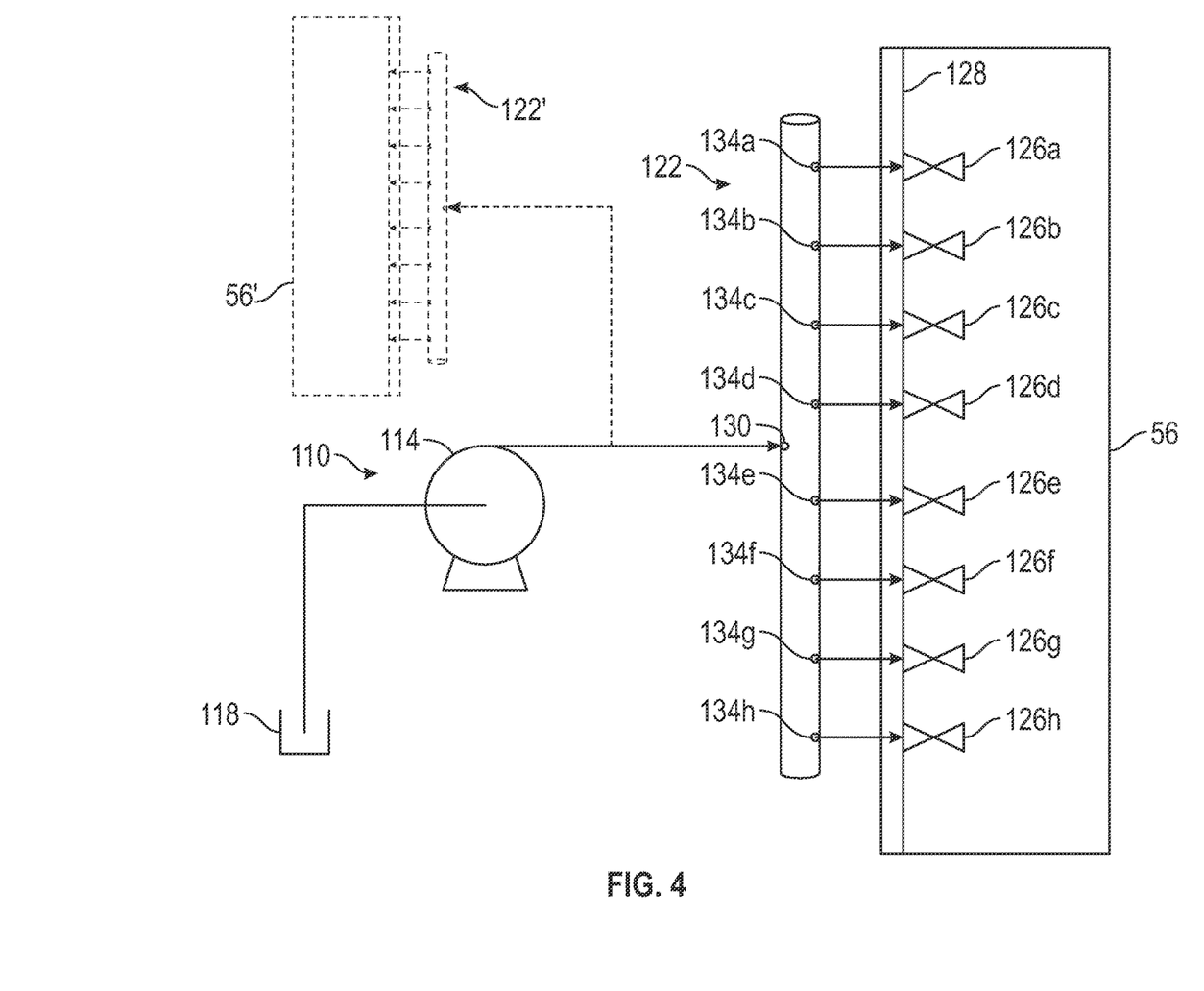
FIG. 4 is a schematic representation of a hydraulic power shift transmission, according to an exemplary embodiment.

As shown in FIG. 4, the hydraulic system 110 includes a pump 114 that provides hydraulic power in the form of a flow of pressurized hydraulic fluid, and a drain or sump 118 to which hydraulic fluid returns and is drawn from by the pump 114. As discussed above, in some embodiments, the pump 114 is driven by the driveline 50. In some embodiments, the pump 114 is a piston pump that generates pressure by a system of springs, a plate, and a rotating shaft. In some embodiments, other pump types are included.

The transmission 56 includes a hydraulic damping rail 122 receiving hydraulic fluid from the pump 114, hydraulic clutch valves 126a-h that selectively provide hydraulic fluid to clutch packs of the transmission 56, and a manifold or valve block 128 that connects each clutch valve 126a-h to the hydraulic damping rail 122. The transmission 56 includes gears and shafts, and operation of a clutch system of the transmission 56 is an important contributor to a performance of the transmission 56. Operation of the clutch system includes the engagement and disengagement of different clutches or clutch packs to realize the effective transfer of power. Coordinated timing of clutch pack engagement and disengagement provides effective change of a transmission gear ratio. In the clutch system, many hydraulic clutch valves 126a-h are connected to a single hydraulic pump 114. In some embodiments, the generated pressure fluctuates with rotation of the pump 114. Additionally, the opening and closing of the hydraulic clutch valves 126a-h changes the hydraulic fluid flow rate and causes a pressure noise in the hydraulic system 110. The pressure fluctuations and system noise can affect the performance of the hydraulic clutch valves 126a-h.

The hydraulic damping rail 122 includes a rail inlet 130 positioned in a first side of the hydraulic damping rail 122 that receives hydraulic fluid from the pump 114, and rail outlets 134a-h positioned on a second side of the hydraulic damping rail 122 opposite of the first side and each rail outlet 134a-h corresponding to a corresponding clutch valve 126a-h. While eight clutch valves 126a-h are shown and described, the transmission 56 can include any number of clutch valves 126 and corresponding clutch packs. For example, less than eight or more than eight clutch packs and corresponding clutch valves 126 are contemplated. The number of rail outlets 134 is matched to the number of clutch packs and clutch valves 126. In other words, the number of rail outlets 134 equals the number of clutch valves 126. In some embodiments, the rail outlets 134a-h are all spaced equidistant from each other. In some embodiments, the rail outlets 134a-h define variable spacing. For example, spacing near the rail inlet 130 may be larger than spacing further from the rail inlet 130. In some embodiments, more than one hydraulic damping rail 122 may be provided to provide hydraulic fluid to more than one set of clutch valves 126a-h. For example, as shown in FIG. 4, a hydraulic damping rail 122' and transmission 56' are shown as optional components. The transmission 56' may be a portion of the transmission 56. For example, the hydraulic damping rail 122 may provide hydraulic fluid to a first set of clutch valves 126a-h and the hydraulic damping rail 122' may provide hydraulic fluid to another set of clutch valves 126a-h'. In some embodiments, the second set of clutch valves may include a different number of clutch valves (e.g., more than 8 or less than eight). In some embodiments, more than two hydraulic damping rails may be included, as desired. In some embodiments, the hydraulic damping rail 122 may be integrated within a valve block as described below. The driveline 50 may include hydraulic damping rails 122 that are stand-alone units separate from the valve block, hydraulic damping rails that are integrated with a valve block as a single unit, or any combination of stand-alone and integrated hydraulic damping rails.

In some embodiments, the hydraulic damping rail 122 is physically separate from the valve block 128 and is mounted within the vehicle 10 in a location separate from the valve block 128. The valve block 128 may be connected to the hydraulic damping rail 122 with hydraulic lines. In some embodiments, the hydraulic damping rail 122 defines a cylindrical shape. In some embodiments, the hydraulic damping rail 122 defines a rectangular shape or another shape, as desired. In some embodiments, the hydraulic damping rail 122 includes internal damping plates, bladder accumulators, piston accumulators, tortured hydraulic flow paths, internal baffles, or other structures that improve the even distribution and flow of hydraulic fluid to each of the rail outlets 134a-h.

Figure 5:
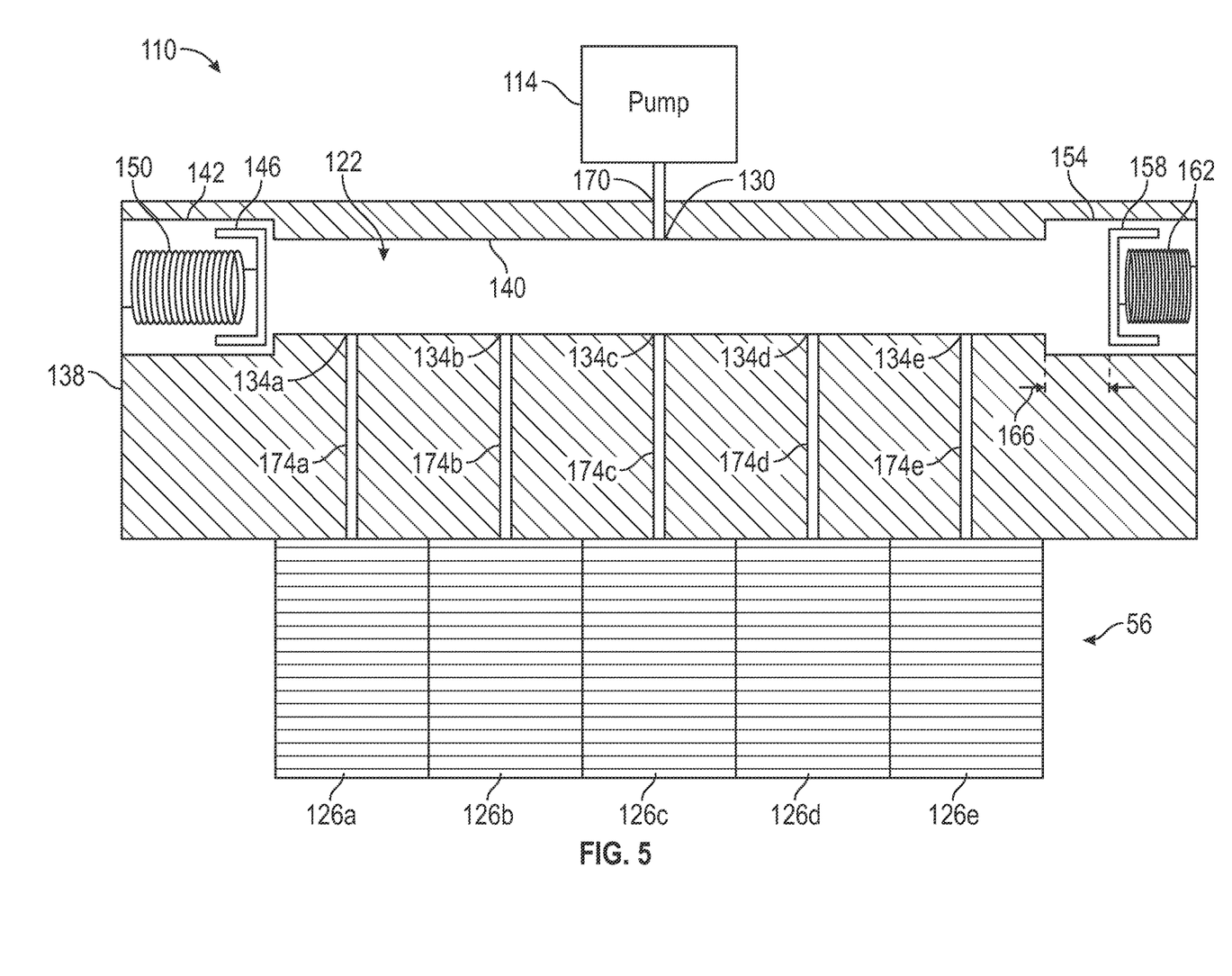
FIG. 5 is a sectional view of the hydraulic power shift transmission of FIG. 4, according to an exemplary embodiment.

As shown in FIG. 5, an integrated damper block 138 includes the hydraulic damping rail 122 and the valve block 128 arranged in a single housing or as a single unit machined as a unitary item and structured to couple to the clutch valves 126a-e. In some embodiments, the hydraulic damping rail 122 may be formed as a separate component and fastened directly to the valve block 128 without intervening hydraulic lines to assemble the integrated damper block 138.

The integrated damper block 138 defines a primary rail wall 140 that defines a primary rail volume. The rail inlet 130 is defined in the primary rail wall 140 and provides fluid communication between the pump 114 and the primary rail volume. The rail outlets 134a-e are also defined in the primary rail wall 140 and provide communication between the primary rail volume and the clutch valves 126a-e. In some embodiments, the primary rail wall 140 defines a cylindrical shape defining a primary diameter.

A secondary rail wall 142 is defined at a first end of the hydraulic damping rail 122 in fluid communication with the primary rail volume defined by the primary rail wall 140. The secondary rail wall 142 defines a secondary rail volume in fluid communication with the primary rail volume. In some embodiments, the secondary rail wall 142 defines a cylindrical shape defining a secondary diameter that is greater than the primary diameter.

A first damping structure in the form of a first damping piston 146 is positioned within the secondary rail volume in sealing arrangement with the secondary rail wall 142 and movable between an extended position (shown in FIG. 5) and a retracted position by hydraulic pressure against the bias of a first spring 150. In some embodiments, the sealing arrangement allows a slow fluid flow past the first damping piston 146 so that hydraulic fluid is arranged on both sides of the first damping piston 146 but flow past the first damping piston 146 is significantly reduced. In some embodiments, the sealing arrangement inhibits the passage of hydraulic fluid into the secondary rail volume. For example, a sliding seal could be provided between the first damping piston 146 and the secondary rail wall 142.

In some embodiments, the first spring 150 is a coil spring providing a predetermined spring bias to the first damping piston 146. In some embodiments, the first spring 150 includes a pneumatic spring (e.g., a gas spring) that may be predetermined or adjustable via a pneumatic system or the control system 400. In some embodiments, the first damping piston 146 and the first spring 150 are replaced with a diaphragm, a bladder accumulator, or another damping system, as desired.

A tertiary rail wall 154 is defined at a second end of the hydraulic damping rail 122 in fluid communication with the primary rail volume defined by the primary rail wall 140. The tertiary rail wall 154 defines a tertiary rail volume in fluid communication with the primary rail volume. In some embodiments, the tertiary rail wall 154 defines a cylindrical shape defining a tertiary diameter that is greater than the primary diameter. In some embodiments, the tertiary diameter is equal to the secondary diameter.

A second damping structure in the form of a second damping piston 158 is positioned within the tertiary rail volume in sealing arrangement with the tertiary rail wall 154 and movable between an extended position and a retracted position (shown in FIG. 5) by hydraulic pressure against the bias of a second spring 162. In some embodiments, the sealing arrangement allows a slow fluid flow past the second damping piston 158 so that hydraulic fluid is arranged on both sides of the second damping piston 158 but flow past the second damping piston 158 is significantly reduced. In some embodiments, the sealing arrangement inhibits the passage of hydraulic fluid into the tertiary rail volume. For example, a sliding seal could be provided between the second damping piston 158 and the tertiary rail wall 154.

In some embodiments, the second spring 162 is a coil spring providing a predetermined spring bias to the second damping piston 158. In some embodiments, the second spring 162 includes a pneumatic spring (e.g., a gas spring)

that may be predetermined or adjustable via a pneumatic system or the control system 400. In some embodiments, the second damping piston 158 and the second spring 162 are replaced with a diaphragm, a bladder accumulator, or another damping system, as desired.

The first damping piston 146 and the second damping piston 158 each define a travel length 166. The travel length 166 together with the secondary diameter and the tertiary diameter define a damping volume. A larger travel length 166 defines a larger damping volume. In some embodiments, the damping volume can refer to the entire usable volume of the hydraulic damping rail 122.

The primary rail volume, the secondary rail volume, and/or the tertiary rail volume act as a pressure reservoir that damps the noise and fluctuations in hydraulic pressure distributed between the rail outlets 134*a*-*e*. The primary diameter is significantly larger than a typical hydraulic manifold or hydraulic line. Typical manifold and lines do not provide damping.

The integrated damper block 138 further defines a block inlet 170 arranged in communication between the pump 114 and the rail inlet 130, and valve passages 174*a*-*e* that connect each clutch valve 126*a*-*e* to the corresponding rail outlet 134*a*-*e*.

Positioning the hydraulic damping rail 122 between the hydraulic pump 114 and the clutch valves 126*a*-*e* eliminates the fluctuations and pressure noise of the hydraulic system 110 caused by opening and closing of clutch valves 126*a*-*e* and the operation of the pump 114. The hydraulic damping rail 122 operates as a pressure reservoir that absorbs the energy of waves of fluctuations and system noise. This can help faster operation of the clutch valves 126*a*-*e* and therefore provides improved gear shifting of the transmission 56. The hydraulic damping rail 122 also decreases the hydraulic pump peak torque requirement and decrease the pump parasitic loss. Therefore, the hydraulic damping rail 122 increases the efficiency of the hydraulic system 110 and the vehicle 10.

The hydraulic damping rail 122 reduces hydraulic system noise and pressure fluctuations, provides faster operation of the clutch valves 126*a*-*e*, enhances the performance of transmission 56 with smooth gear shifting, increases the efficiency of the hydraulic system 110 and the vehicle 10, and reduces the pump peak torque requirement and parasitic loss. The integrated damper block 138 can also reduce the total number of components that need to be installed on the vehicle 10 and reduces the incidents of improper installation.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that the construction and arrangement of the vehicle 10 and the systems and components thereof (e.g., the driveline 50, the braking system 100, the hydraulic system 110 the control system 400, etc.) as shown in the various exemplary embodiments is illustrative only. Additionally, any element disclosed in one embodiment may be incorporated or utilized with any other embodiment disclosed herein.

The invention claimed is:

1. A hydraulic damping rail for a power shift transmission, the hydraulic damping rail comprising:
   a primary rail wall defining a primary rail volume;
   a rail inlet configured to fluidly couple the primary rail volume to a hydraulic pump; and
   a plurality of rail outlets configured to fluidly couple the primary rail volume to a plurality of clutch valves, wherein a spacing between adjacent pairs of rail outlets of the plurality of rail outlets is variable.

2. The hydraulic damping rail of claim 1, wherein a first spacing between a first adjacent pair of rail outlets positioned proximate the rail inlet is larger than a second spacing between a second adjacent pair of rail outlets positioned further from the rail inlet.

3. The hydraulic damping rail of claim 1, further comprising a manifold fluidly coupled to the plurality of rail outlets, the manifold configured to fluidly couple to the plurality of clutch valves.

4. The hydraulic damping rail of claim 3, wherein the manifold defines passages configured to fluidly couple each rail outlet of the plurality of rail outlets to a respective one of the plurality of clutch valves.

5. The hydraulic damping rail of claim 1, wherein the rail inlet is positioned on a first side of the primary rail wall and the plurality of rail outlets are all positioned on a second side of the primary rail wall opposite the first side.

6. The hydraulic damping rail of claim 1, further comprising a secondary rail wall defining a secondary rail volume.

7. The hydraulic damping rail of claim 6, wherein the primary rail wall defines a first diameter, and wherein the secondary rail wall defines a second diameter greater than the first diameter.

8. The hydraulic damping rail of claim 7, further comprising a damper positioned within the secondary rail volume.

9. The hydraulic damping rail of claim 8, wherein the damper includes a piston.

10. The hydraulic damping rail of claim 9, wherein the damper includes a spring biasing the piston.

11. The hydraulic damping rail of claim 8, wherein the damper is a first damper, further comprising:
   a tertiary rail wall defining a tertiary rail volume; and
   a second damper positioned within the tertiary rail volume.

12. The hydraulic damping rail of claim 11, wherein the secondary rail volume and the tertiary rail volume are positioned on opposing ends of the primary rail volume.

13. A hydraulic damping rail for a power shift transmission, the hydraulic damping rail comprising:
   a rail wall defining a volume, wherein a cross-sectional dimension of the volume varies along a length of the rail wall;
   a rail inlet configured to fluidly couple the volume to a hydraulic pump; and
   a plurality of rail outlets configured to fluidly couple the volume to a plurality of clutch valves.

14. The hydraulic damping rail of claim 13, wherein a spacing between adjacent pairs of rail outlets of the plurality of rail outlets is variable.

15. The hydraulic damping rail of claim 13, wherein a first portion of the volume has a first diameter, and wherein a second portion of the volume has a second diameter greater than the first diameter.

16. The hydraulic damping rail of claim 15, further comprising a damper positioned within the second portion of the volume.

17. The hydraulic damping rail of claim 15, wherein a third portion of the volume has a third diameter greater than the first diameter.

18. The hydraulic damping rail of claim 17, wherein the second portion and the third portion are positioned on opposing sides of the first portion.

19. A hydraulic damping rail for a power shift transmission, the hydraulic damping rail comprising:
   a rail wall defining a volume;
   a rail inlet configured to fluidly couple the volume to a hydraulic pump;
   a plurality of rail outlets; and
   a manifold fluidly coupled to the plurality of rail outlets, the manifold configured to fluidly couple to a plurality of clutch valves.

20. The hydraulic damping rail of claim 19, wherein at least one of (a) a spacing between adjacent pairs of rail outlets of the plurality of rail outlets is variable or (b) a cross-sectional dimension of the volume varies along a length of the rail wall.

* * * * *